| (12) United States Patent | (10) Patent No.: US 8,958,459 B2 |
|---|---|
| Zhu et al. | (45) Date of Patent: Feb. 17, 2015 |

(54) METHOD AND APPARATUS FOR DESPREAD DATA IN WIRELESS COMMUNICATION SYSTEM

(75) Inventors: Xia Zhu, Shanghai (CN); Yan Li, Shanghai (CN)

(73) Assignee: ST-Ericsson SA, Plan-les-Ouates (CH)

( * ) Notice: Subject to any disclaimer, the term of this patent is extended or adjusted under 35 U.S.C. 154(b) by 608 days.

(21) Appl. No.: 11/815,207

(22) PCT Filed: Jan. 19, 2006

(86) PCT No.: PCT/IB2006/050194
§ 371 (c)(1), (2), (4) Date: Jul. 31, 2007

(87) PCT Pub. No.: WO2006/079948
PCT Pub. Date: Aug. 3, 2006

(65) Prior Publication Data
US 2008/0198905 A1 Aug. 21, 2008

(30) Foreign Application Priority Data
Jan. 31, 2005 (CN) .......................... 2005 1 0005057
Jan. 19, 2006 (WO) .................. PCT/IB2006/050194

(51) Int. Cl.
*H04B 1/00* (2006.01)
*H04B 1/707* (2011.01)

(52) U.S. Cl.
CPC ...... *H04B 1/707* (2013.01); *H04B 2201/70707* (2013.01)
USPC ...................................................... 375/147

(58) Field of Classification Search
USPC ....................................................... 375/147
See application file for complete search history.

(56) References Cited

U.S. PATENT DOCUMENTS

| 6,084,851 | A | 7/2000 | Iwasaki |
| 6,359,875 | B1 | 3/2002 | Hamada et al. |
| 7,218,692 | B2 * | 5/2007 | Dabak et al. ................... 375/346 |
| 2001/0022811 | A1 * | 9/2001 | Lillington ..................... 375/229 |

(Continued)

FOREIGN PATENT DOCUMENTS

| EP | 0 661 829 A2 | 7/1995 |
| EP | 0661826 A2 | 7/1995 |

(Continued)

OTHER PUBLICATIONS

International Search Report dated Jun. 14, 2006 in connection with PCT Application No. PCT/IB2006/050194.

(Continued)

*Primary Examiner* — Tanmay Shah
(74) *Attorney, Agent, or Firm* — Coats & Bennett, PLLC

(57) ABSTRACT

The present invention provides a method for despreading spread signal used in a receiver of a wireless communication system, comprising the steps of: preprocessing spread signal to derive a group of spreading chips corresponding to a data symbol; processing Hie spreading chips to extract cophase components and orthogonal components of each of the spreading chips; and converting and combining the group of cophase components and orthogonal components according to a preset selecting signal to derive a group of despreading chips. The present invention further provides an apparatus for carrying out the above-mentioned method, which significantly simplifies the design of a dispreading circuit and reduces the area of the dispreading circuit.

21 Claims, 7 Drawing Sheets

(56) References Cited

U.S. PATENT DOCUMENTS

2005/0018759 A1* 1/2005 Underbrink et al. .......... 375/152
2006/0133551 A1* 6/2006 Davidoff et al. .............. 375/350

FOREIGN PATENT DOCUMENTS

| EP | 661829 | A2 * | 7/1995 |
| EP | 854856 | A2 * | 1/1997 |
| EP | 0854586 | A2 | 7/1998 |
| JP | 10209917 | A | 8/1998 |
| JP | 11127089 | A | 5/1999 |
| JP | 2004173047 | A | 6/2004 |
| WO | 2004077693 | A1 | 9/2004 |
| WO | WO 2004/077693 | A1 | 9/2004 |

OTHER PUBLICATIONS

Written Opinion of the International Searching Authority dated Jul. 31, 2007 in connection with PCT Application No. PCT/IB2006/050194.

* cited by examiner

METHOD AND APPARATUS FOR DESPREAD DATA IN WIRELESS COMMUNICATION SYSTEM

CROSS-REFERENCE TO RELATED APPLICATION(S)

The present application claims priority under 35 U.S.C. §365 to International Patent Application No. PCT/IB2006/050194 filed Jan. 19, 2006, entitled "METHOD AND APPARATUS FOR DESPREAD DATA IN WIRELESS COMMUNICATION SYSTEM". International Patent Application No. PCT/IB2006/050194 claims priority under 35 U.S.C. §365 and/or 35 U.S.C. §119(a) to Chinese Patent Application No. 200510005057.1 filed Jan. 31, 2005 and which are incorporated herein by reference into the present disclosure as if fully set forth herein.

FIELD OF THE INVENTION

The present invention relates to the wireless communication field, and more particularly, to a method and apparatus for despreading a spread signal in TD-SCDMA (Time Division-Synchronous Code Division Multiple Access) and/or WCDMA (Wideband Code Division Multiple Access) system.

BACKGROUND OF THE INVENTION

Spread spectrum technology, or spreading technology, is a technology developed very quickly in the recent years, which not only plays an advantageous role in military communication but also is widely used in every field of communication, for example, satellite communication, mobile communication, microwave communication, wireless positioning system, wireless local area network (LAN), global personal communication.

Spreading communication can be briefly expressed as follows: a way for transmitting information, with the signal occupying a bandwidth far more wider than the narrowest bandwidth necessary for transmitting information; the bandwidth is spread by encoding and modulation methods and is irrelevant to the transmitted information data; and the transmitted information data are despread and restored by an identical spreading code at a receiver. Spreading technology is used in the following forms: direct sequence spread spectrum (abbreviated as Direct Spread (DS)), Frequency Hopping (FH), Time Hopping (TH) and linear frequency modulation (Chirp), and the combinations thereof such as FH/DS, TH/DS and FH/TH, wherein DS, FH and FH/DS are used most frequently in the communication.

Spreading communication technology is characterized as follows:

1. Potent Anti-Scrambling Capacity

Since signal is spread to a wide band, narrowband signal is restored by compressing bandwidth of spread signal at receiver. Because the scrambling signal, which is irrelevant to a spreading pseudo-random code, is spread to a wide band, the scrambling power, which enters into communication bandwidth of a useful signal, is greatly reduced, and then the signal-to-interference ratio of the correlator is increased. Thus the spreading communication technology has a strong anti-scrambling capacity. This capability is in a direct ratio to the spreading times of the band: the wider the spectrum is spread, the stronger anti-scrambling capacity is.

2. Multiple Access Communication

Spreading communication per se is a way of multiple access communication, named SSMA (Spread Spectrum Multiple Access). It per se is a form of CDMA (Code Division Multiple Access), which forms different networks with different spreading codes. Although occupying a wide band, the spectrum utilization ratio of a spreading system is higher than that of a single channel single carrier system, because different networks can share the same frequency simultaneously. CDMA is a main form of multiple access communication for the future global personal communication.

3. Secure and Confidential

Since spreading system spreads the transmitted information to a wide band, the power density reduces with the spreading of the spectrum, and the signal may even be submerged by the noises. Accordingly, the spread signal has strong security, and is quite difficult to be intercepted, eavesdropped and detected. Unless the same spreading code as that used by transmitter is used and correlation detection is performed after synchronization therewith, nothing can be done about the spread signal. Since the spread signal has a low power spectrum density, a specific frequency band, e.g. ISM frequency band, can be used without approval in many countries such as USA, Japan and European countries, as long as the power spectrum density meets some requirements.

4. Multi-Path Interference Rejection

Under some communication circumstances such as mobile communication and indoor communication where there is serious multi-path interference, a system must have a strong anti-interference capacity to ensure unimpeded communication. Spreading technology has a strong multi-path interference rejection capacity by use of the relevant characteristics of the spreading code used by spreading, and can even improve the performance of the system by use of multi-path energy.

CDMA system, which employs spreading technology, operates quite differently from the conventional TDMA and FDMA communication systems. In a direct sequence-CDMA (DS-CDMA) transmitter, for example, a digital symbol stream for a given dedicated or common channel at a basic symbol rate is spread to a chip rate. This spreading operation involves applying a channel unique spreading code (sometimes referred to as a signature sequence) to the symbol stream that increases its signal gain while adding bandwidth redundancy.

Typically, the digital symbol stream is multiplied by a channel code during spreading to derive a channelized intermediate signal including data information. The intermediate signal is then added to other intermediate signals using different channel codes. The summed intermediate signals are then multiplied by cell scrambling code to obtain a group of spread signals. Since all channel codes are orthogonal with each other, different users may share transmitting bandwidth at a specific time slot via different channel codes. And through the application of proper processing techniques at the receiver, the intermediate signals may be distinguished from others.

In the TD-SCDMA systems, the original data are restored by applying (i.e. multiplying, or matching) the appropriate scrambling codes and channel codes to despread spread signal at the receiver. Where the spreading code is applied to other transmitted and received intermediate signals, however, only noise is produced. The despreading operation thus effectively comprises a correlation process that compares the received signal with the appropriate digital code to recover the desired information from the channel.

In the TD-SCDMA systems, spreading is applied to the data part of the physical channels and comprises two operations. The first is the channelisation operation, which transforms every data symbol into a number of chips, thus increasing the bandwidth of the signal. The number of chips per data symbol is called the Spreading Factor (SF). The second operation is the scrambling operation, where a scrambling code is applied to the spread signal. The two operations are generally called spread operation together, wherein channel code and scrambling code are called spreading code together. It is required in TD-SCDMA system standard that downlink physical channels shall use SF=16. Multiple parallel physical channels can be used to support higher data rates. These parallel physical channels shall be transmitted using different channelisation codes.

The spread and despread of signals can be expressed by the following formula.

$$z(i) = x(\lceil[(i-1)/SF]+1\rceil)p\{[(i-1) \bmod SF]+1\} \quad (1)$$

$$x(n) = \frac{1}{SF}\sum_{i=1}^{SF} z[(n-1) \times SF + i]p^*(i).$$

Where $x(n)$ is the signal before spreading, $p(i)$ is the spreading code and $z(i)$ is the signal after spreading, $\lceil A \rceil$ denotes the round operation and the return value is the nearest integers greater than or equal to A.

The conventional despreading method and apparatus require a large amount of multipliers. However, such multipliers have complicated structures and occupy a relatively large chip area. So, if they can be replaced by other simple circuit structure, then the chip area can be greatly reduced and the production cost decreased by a big margin. Therefore, there is a need for a despreading method and apparatus capable of reducing the production cost significantly.

OBJECT AND SUMMARY OF THE INVENTION

It is an object of the present invention to provide a dispreading method and apparatus, which can remarkably reduce the circuit area in comparison with the conventional apparatus.

It is another object of the present invention to provide a dispreading method and apparatus, which can perform the despreading function via a simple circuit without multipliers employing complicated circuits.

It is a further object of the present invention to provide a dispreading method and apparatus, which can process data in parallel.

It is the furthermost object of the present invention to provide a dispreading method and apparatus, wherein only one set of data input port is needed for each pipeline of despread calculation.

To partly or completely fulfill these objects, according to one aspect of the present invention, there is provided a method for despreading a spread signal in a receiver of a wireless communication system, which comprises the steps of: preprocessing the spread signal to derive a group of spreading chips, the group of spreading chips corresponding to a data symbol; processing the spreading chips to extract the cophase components and the orthogonal components of each of the spreading chips; and converting and combining the group of cophase components and orthogonal components based on a preset selecting signal to derive a group of despreading chips.

According to another aspect of the present invention, there is provided an apparatus for despreading spread signal in a receiver of a wireless communication system, which comprises: a preprocess means for preprocessing spread signal to derive a group of spreading chips corresponding to a data symbol; an extraction means for processing the spreading chips to extract the cophase components and the orthogonal components of each of the spreading chips; and a selecting and processing means for converting and combining the group of cophase components and orthogonal components to derive a group of despreading chips based on a preset selecting signal.

Other objects and effects of the present invention will become more explicit and comprehensible from the following description taken in conjunction with the accompanying drawings, contents in the claims as well as a fuller understanding of the present invention.

BRIEF DESCRIPTION OF THE DRAWINGS

Hereinafter, the preferred embodiments of the present invention will be described with reference to the accompanying drawings in which.

DETAILED DESCRIPTION OF THE INVENTION

Figure 1:
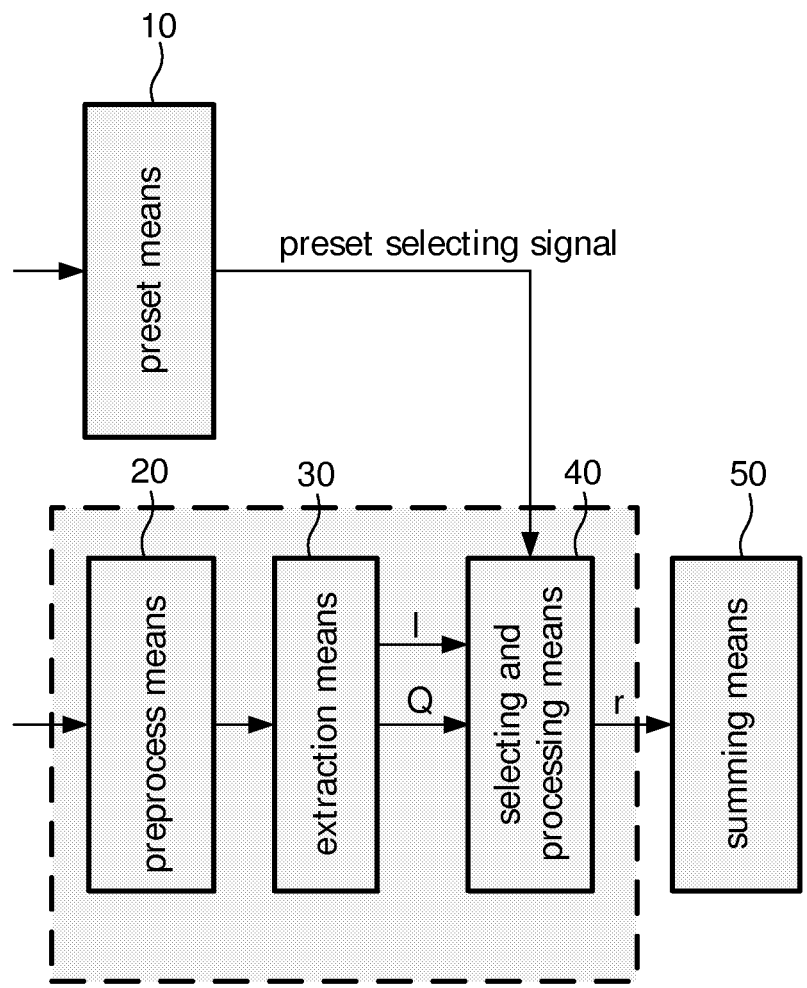
FIG. 1 is a structure diagram illustrating the principle of a despreading apparatus according to an embodiment of the present invention.

The principles of a despreading apparatus and method according to the present invention will be further explained with reference to FIGS. 1 to 3. FIG. 1 is a structure diagram illustrating the principle of a despreading apparatus according to an embodiment of the present invention. As shown in FIG. 1, the despreading apparatus according to the present invention comprises a preset means 10, a preprocess means 20, an extraction means 30, a selecting and processing means 40 and a summing means 50.

The preprocess means 20 preprocesses a received spread signal to derive a group of spreading chips corresponding to a data symbol. The length of the spreading chips equals that of a known spreading sequence $p(i)$; $\{i=1, 2, \ldots, SF\}$. The extraction means 30 processes the spreading chips derived from the preprocess means 20 to extract the cophase components and the orthogonal components of each of the spreading chips, wherein the cophase components correspond to the above-mentioned I components, and the orthogonal components correspond to the above-mentioned Q components. The cophase components I and the orthogonal components Q derived by the extraction means 30 are provided to the selecting and processing means 40, which comprises one or more selectors. The selecting and processing means 40 converts and combines a group of cophase components I and orthogonal components Q, based on a preset selecting signal, to obtain a group of despreading chips r. The dispreading chips r obtained by the selecting and processing means 40 are summed by the summing means 50 to restore the data symbol.

Figure 2:
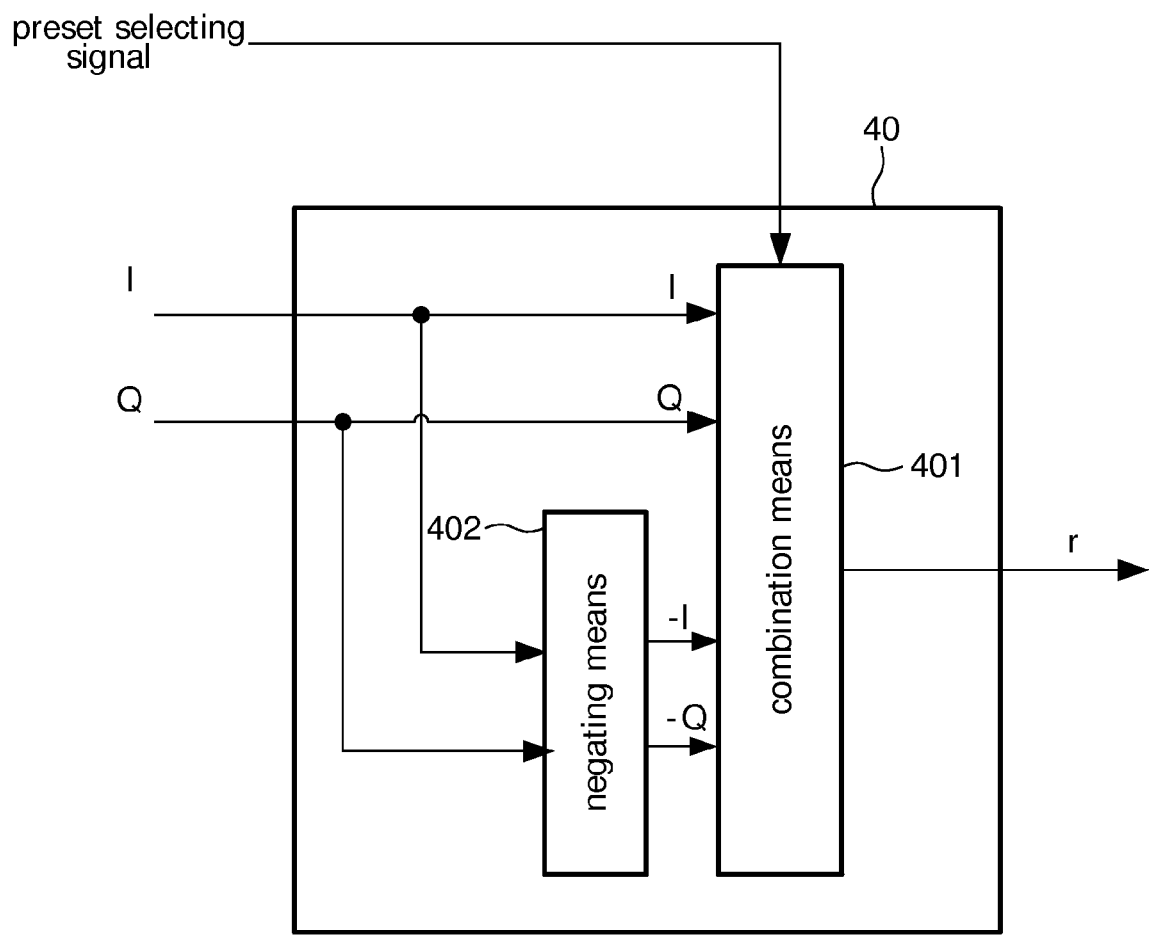
FIG. 2 is a schematic view of the inner structure of a selecting and processing means as shown in FIG. 1.

FIG. 2 is a schematic diagram of the inner structure of the selecting and processing means 40 as shown in FIG. 1. The selecting and processing means 40 comprises a combining means 401 and a negated means 402. The negated means 402 receives the cophase component I and the orthogonal component Q, derives the negated signals −I and −Q, and inputs the cophase component I, the orthogonal component Q, together with the negated signals −I and −Q into the combining means 401. The combining means selectively calculates and outputs the preset combining result between the cophase component I, the orthogonal component Q and the negated signals thereof based on the preset selecting signal. The preset combining result is one of an expected group of specific combining results. As depicted with respect to the first and second embodiments hereinafter, when the wireless communication system is TD-SCDMA system, a value of each unit p(i) of the known spreading sequence is selected from the set $\{1, -1, j, -j\}$, and the group of expected results is selected from the set $\{I+jQ, -I-jQ, -Q+jI, Q-jI\}$, in which I is a cophase component, Q is an orthogonal component, −I is a negated cophase component, and −Q is a negated orthogonal component.

The idea of the present invention can also be used in WCDMA wireless communication system. When the wireless communication system is WCDMA system, a value of each unit p(i) of the known spreading sequence is one of the set $\{1+j, 1-j, 1+j, -1-j\}$. The preset means 10 generates a corresponding preset selecting signal based on the value of p*(i) selected from $\{1+j, 1-j, 1+j, -1-j\}$, which may, for example, be expressed by two-bit binary digit. The selecting and processing means 40 outputs an expected result selected based on the received preset selecting signal. It can be seen by calculation that the group of expected results is one of the set $\{(I-Q)+j(I+Q), (I+Q)+j(-I+Q), (-I-Q)+j(I-Q), (-I+Q)+j(-I-Q)\}$, in which I is a cophase component, Q is an orthogonal component, −I is a negated cophase component, and −Q is a negated orthogonal component.

Hence, when spreading sequence p(i) is a value selected from a limited set, it is expectable that the despreading result is also a value selected from a limited set. Thus, a combining calculation of selector, negator and adder can be used to implement multiplication for despreading, so as to simplify a despreading circuit and reduce a circuit area.

Figure 3:
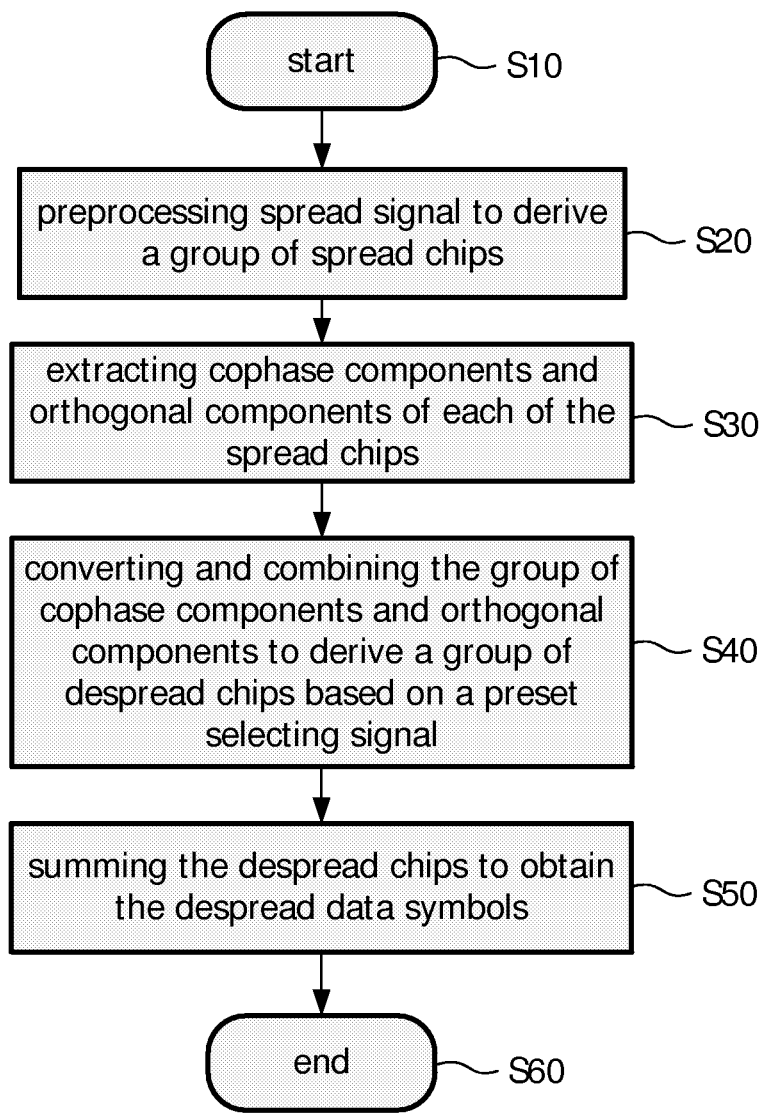
FIG. 3 is a flowchart of a despreading method according to an embodiment of the present invention.

FIG. 3 is a flowchart of a despreading method according to the present invention. Firstly, a spread signal is preprocessed in step S20 to derive a group of spreading chips; cophase components I and the orthogonal components Q of each of the spreading chips are extracted in step S30; then, in step S40, the group of cophase components Q and orthogonal components I is converted and combined to derive a group of despreading chips based on a preset selecting signal; and finally, in step S50, the despreading chips are summed to derive despread data symbol.

Embodiment 1

Figure 4I:
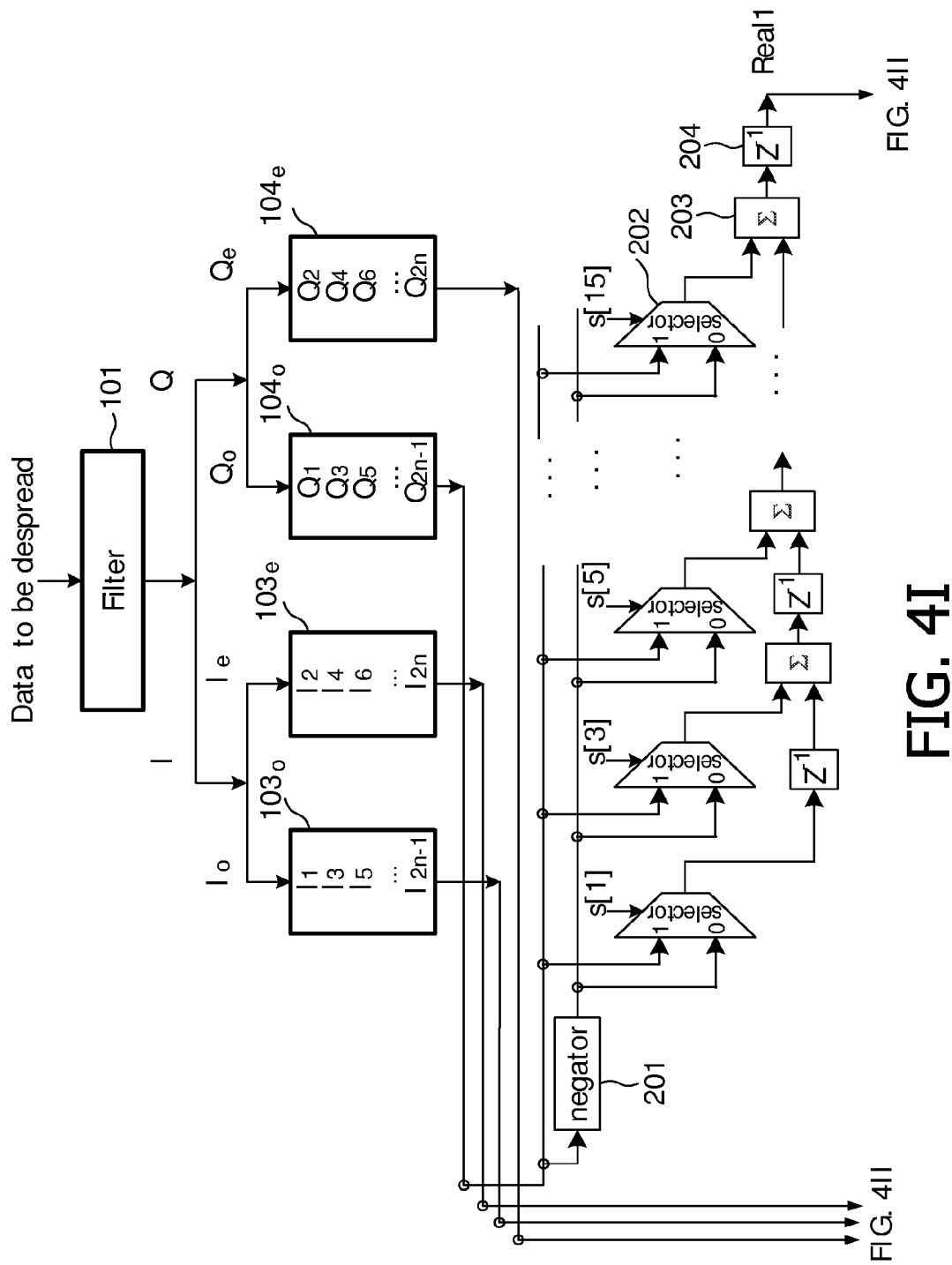
FIG. 4 is a circuit structure diagram of a despreading apparatus according to the first embodiment of the present invention.
Figure 4I:
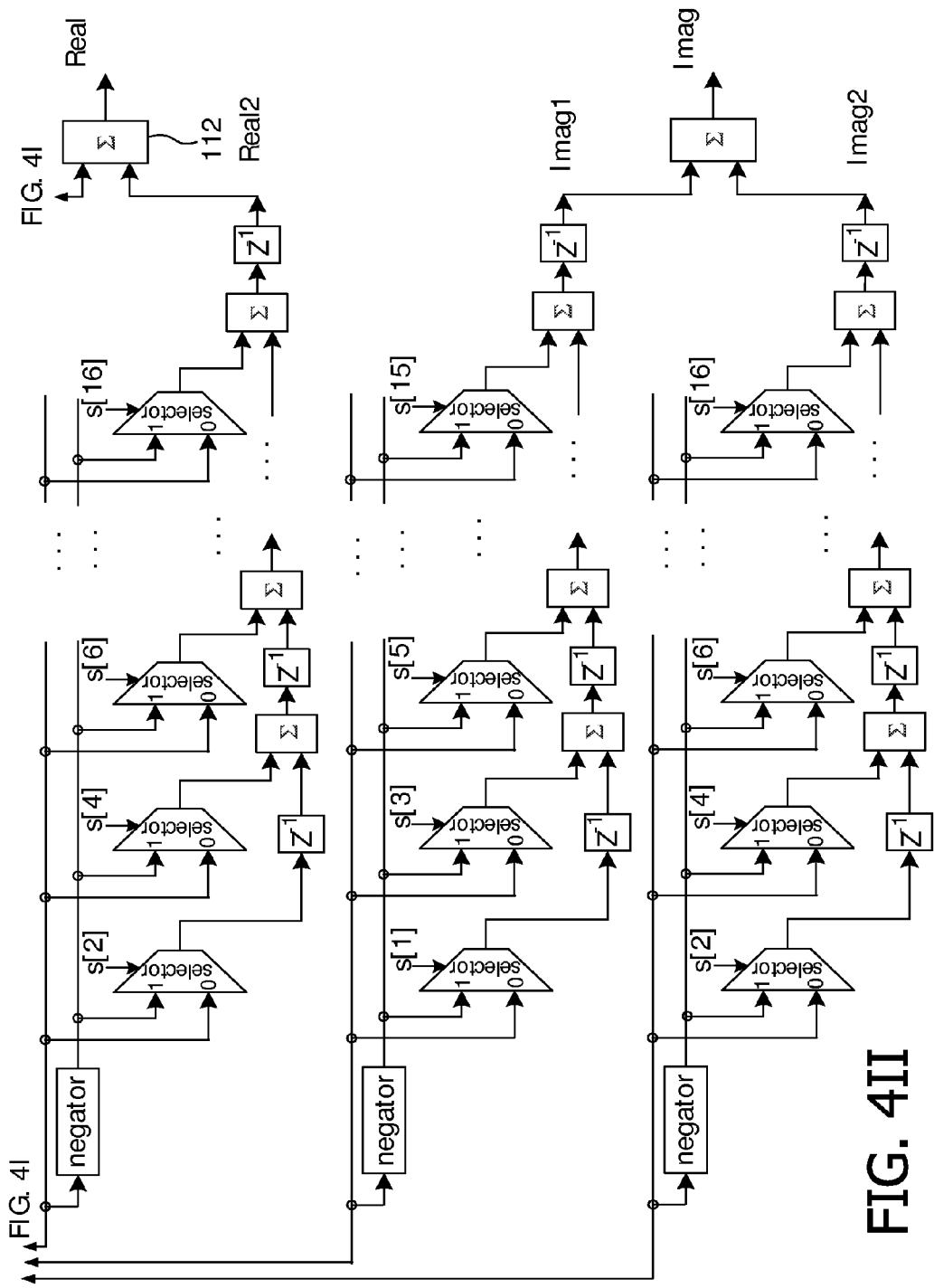

FIG. 4 is a circuit structure diagram of a despread apparatus according to Embodiment 1 of the present invention. Hereinafter, Embodiment 1 will be further illustrated with reference to FIG. 4.

In the TD-SCDMA systems, the spreading of data comprises two operations: channelisation and scrambling. Firstly, each complex valued data symbol is spread with a real valued channelisation code. The resulting sequence is then scrambled by a cell specific complex scrambling sequence. The combination of the user specific channelisation and cell specific scrambling codes can be seen as a user and cell specific spreading code. In the downlink of TD-SCDMA systems, both the SF and the length of scrambling sequence are 16. Hence, it is convenient to recover the original data by spreading a received signal with the channelisation code and scrambling code together.

the scrambling code in TD-CDMA is complex, of which the elements are alternating real and imaginary. And the channelisation code is always real. Therefore, the spreading code is alternating real and imaginary.

According to the 3GPP standard for TD-SCDMA, spreading sequence is p(i); $\{i=1, 2, \ldots, SF\}$.

$$p(i)=(j)^i \cdot v_i, v_i \epsilon(1,-1); i=1,2,\ldots,SF$$

where, j denotes an imaginary unit, and SF denotes a spreading factor.

The odd bits in spreading code are always imaginary and the even bits in spreading code are always real. That is $$\begin{cases} p(i) \in \{1, -1\}, & i = 2n \\ p(i) \in \{j, -j\}, & i = 2n+1 \end{cases} \quad (2)$$

where n is an integer;
Suppose $$z[(n-1)\times SF+i]=w(i)=I+jQ \quad (3)$$

is a received signal, in which I is a cophase component, and Q is an orthogonal component. In the despreading, the data multiplies the conjugate of the spreading code and sums the number of results. Suppose y(i) is the result of one multiplication, which is $$y(i) = z[(n-1)\times SF + i] \times p^*(i) = w(i) \times p^*(i) = \begin{cases} I+jQ & p^*(i)=1 \\ -I-jQ & p^*(i)=-1 \\ -Q+jI & p^*(i)=j \\ Q-jI & p^*(i)=-j \end{cases} \quad (4)$$

where p*(i) is the conjugate of the spreading code p(i).

In the conventional way for despreading, both I component and Q component are required at any time to calculate a multiplication result. In the present invention, however, only I component or Q component is required at a time to derive the multiplication result.

According to the present invention, in order to obtain the real component of the despread data, only the Q component is needed to be input for the multiplication with the odd bits of a spreading sequence, and only the I component is needed to be input for the multiplication with the even bits of a spreading sequence. Similarly, to obtain the imaginary component of the despread data, only the I component is needed to be input for the multiplication with the odd bits of a spreading sequence, and only the Q component is needed to be input for the multiplication with the even bits of a spreading sequence.

From formula (4) it can be seen that the multiplier is not required in implementation, and the sign of the conjugate of the spreading code p*(i) can be used as an input to the selector to derive the result of multiplication. In the following formula sign[p*(i)]=0 denotes a positive, and sign [p*(i)]=1 denotes a negative.

when n=2k, k∈integer, $$\text{Re}[y(i)] = \begin{cases} I & p^*(i) = 1 \quad \text{sign}[p^*(i)] = 0 \\ -I & p^*(i) = -1 \quad \text{sign}[p^*(i)] = 1 \end{cases} \quad (5)$$

$$\text{Im}[y(i)] = \begin{cases} Q & p^*(i) = 1 \quad \text{sign}[p^*(i)] = 0 \\ -Q & p^*(i) = -1 \quad \text{sign}[p^*(i)] = 1 \end{cases}$$

when $n = 2k + 1, k \in$ integer, $$\text{Re}[y(i)] = \begin{cases} -Q & p^*(i) = j \quad \text{sign}[p^*(i)] = 0 \\ Q & p^*(i) = -j \quad \text{sign}[p^*(i)] = 1 \end{cases} \quad (6)$$

$$\text{Im}[y(i)] = \begin{cases} I & p^*(i) = j \quad \text{sign}[p^*(i)] = 0 \\ -I & p^*(i) = -j \quad \text{sign}[p^*(i)] = 1 \end{cases}.$$

In formula (5), when i is even, if the sign of the conjugate of the spreading code p*(i) is 0, then in formula (4), the real of the result of multiplication y(i) is I and the imaginary is Q; if the sign of the conjugate of the spreading code p*(i) is 1, then in formula (4), the real of the result of multiplication y(i) is −I and the imaginary is −Q. In formula (6), when n is odd, if the sign of the conjugate of the spreading code p*(i) is 0, then in formula (4), the real of the result of multiplication y(i) is Q and the imaginary is I; if the sign of the conjugate of the spreading code p*(i) is 1, then in formula (4), the real of the result of multiplication y(i) is Q and the imaginary is −I.

From an implementation point of view, only the sign bit of the conjugate of spread code is used as a selecting signal of the selector. In FIG. 1, s(i) means sign of p*(i).

The following formula (7) can be derived from formula (1) and formula (4), both the real and imaginary of the despread data are the sum of two parts. The first part is the summed result of the multiplication of the even bits of a spreading sequence, and the second part is the summed result of the multiplication of the odd bits of a despreading sequence.

$$\text{Re}[x(n)]1 = \sum_{i=1}^{SF-1} \text{Re}\{z[(n-1)] \times SF + i]p^*(i)\}, \quad (7)$$

$i \in 2k+1, p^*(i) \in \{j, -j\}$ $$\text{Re}[x(n)]2 = \sum_{i=2}^{SF} \text{Re}\{z[(n-1)] \times SF + i]p^*(i)\},$$

$i \in 2k, p^*(i) \in \{1, -1\}$ $$\text{Im}[x(n)]1 = \sum_{i=1}^{SF-1} \text{Re}\{z[(n-1)] \times SF + i]p^*(i)\},$$

$i \in 2k+1, p^*(i) \in \{j, -j\}$ $$\text{Im}[x(n)]2 = \sum_{i=2}^{SF} \text{Re}\{z[(n-1)] \times SF + i]p^*(i)\},$$

$i \in 2k, p^*(i) \in \{1, -1\}$

In the above formula, Re[x] denotes the real of x, IM[x] denotes the imaginary of x, i, 1, n and k are all integers.

The despreading method and apparatus of the present invention are set forth using the above formula. First, sign [i]=sign[p*(i)] of conjugate p*(i) of the spreading code p(i) is calculated. Then, the obtained sign value serves as an input to a selecting end of a selector, and Q and −Q or I and −I serve as inputs to a standby inputting end of the selector. In this way, the multiplication in formula (4) can be performed by the alternative selector.

Specifically, the present invention applies the following methods to despread a received signal. The first step is to store signals after Raised Cosine Filter (RCF) separately. Suppose w(i)=I(i)+jQ(i) is the data needed to be despread, we store all I(i), i=2k, k∈ integer into a consecutive memory space, such as RAM (Random Access Memory); and store all I(i), i=2k+1, k∈ integer into another consecutive memory space. Similarly, we store all Q(i), i=2k, k∈ integer and all Q(i), i=2k+1, k∈ integer into a consecutive memory space, respectively. Thus, totally four blocks of memory are needed.

FIG. 4 is a circuit structure diagram illustrating a despreading apparatus according to the first Embodiment of the present invention. In FIG. 4, data to be despread are filtered by a filter 101 (the filter can be Raised Cosine Filter or Root Raised Cosine Filter) and divided into I and Q components. According to sequence, the I and Q components are alternatively divided into odd and even components, namely $I_o$ and $I_e$, $Q_o$ and $Q_e$, respectively ("o" as subscript denotes an odd components in the odd sequence, "e" as subscript denotes an even component in the even sequence), which are stored in four blocks of memory $103_o$, $103_e$, $104_o$ and $104_e$, respectively. $Q_o$ component is sequentially input to the first inputting end of a plurality of selectors 202 (represented by "1" of the selector 202 as shown in FIG. 4), and result $-Q_o$ of $Q_o$ passing through the negator is input to the second inputting end of the selectors (represented by "0" of selector 202 as shown in FIG. 4). Please note that, the memories $103_o$, $103_e$, $104_o$ and $104_e$ can be omitted and the I and Q components are directly output to the following cascades of the circuit. Where the memories $103_o$, $103_e$, $104_o$ and $104_e$ are used, each clock period can output two groups of components I and Q downwards; for example, during the first clock period, the components $I_1$ and $Q_1$ and $I_2$ and $Q_2$ are output, and in the second clock period, the components $I_3$ and $Q_3$ and $I_4$ and $Q_4$ are output downwards. Where the memories $103_o$, $103_e$, $104_o$ and $104_e$ are omitted, each clock period can output two groups of components I and Q downwards; for example, in the first clock period, the components $I_1$ and $Q_1$ are output, and during the second clock period, the components $I_2$ and $Q_2$ are output downwards. Suppose {p(1), p(2), p(3), ..., p(16)} is a spread sequence used in the downlink of the TD-SCDMA system, firstly, the spreading sequence is separated into two parts: {p(1), p(3), p(5), ..., p(15)} and {p(2), p(4), p(6), ..., p(16)}; next, conjugate p*(i)(i=1~16){p(1),p(3),p(5), ..., p(15)} of and {p(2),p(4),p(6), ..., p(16)} is calculated; and then, sign of the p*(i) is calculated to obtain s[i]=sign[p*(i)] (when p*(i) is a positive, s[i] is 0; when p*(i) is a negative, s[i] is 1). The signs [1], s[3], ..., s[15] in odd positions of p*(i) are input in parallel to the selecting ends of the plurality of alternative selector 202, the components $Q_1, Q_3, ..., Q_{2n-1}$ in odd number of Q component are sequentially input to inputting end "1" of the selectors 202, and the values resulting from negating Q1, $Q_3, ..., Q_{2n-1}$ by the negator 201 are sequentially input to inputting end "0" of the plurality of selectors 202, respectively. The selector 202 correspondingly selects and outputs a signal input at inputting ends "0" input and "1" based on the sign 0 or 1 input at the selecting end. The output of each selector 202 is summed with the output of the upper cascade of the circuit, and the summed result is output as the present cascade of the circuit after being delayed one clock period by a delayer and is further summed with the output from the selector of the next cascade, as so on. Till the last cascade of the circuit, the result Real 1 of the first circuit branch is obtained. Please note that, if two groups of I and Q components are output in each clock period, only result Real 1 output at the last cascade of the circuit is the correct result after SF integral times of clock periods since the selector 202 receives the first group of I and Q components; therefore, results output in the other clock periods, except the SF/2 integral times of clock periods, will not be considered. Similarly, if a group of I and Q components is output during each clock period, only result Real 1 output at the last cascade of the circuit is the correct result after SF integral times of clock periods since the selector 202 receives the first group of I and Q components; therefore, results output in the other clock periods, except SF/2 integral times of clock periods, will not be considered. This will be more clearly represented in Table 1 below, and it is the same case in the second to fourth branches of circuit.

Similarly, signs s[2], [4], . . . , s[16] in even position of p*(i) are input in parallel to the selecting end of the plurality of alternative selectors 202, the components $I_2, I_4, \ldots, I_{2n}$ of I components in even number are sequentially input to inputting end "0" of the plurality of selectors 202 and are then sequentially input to inputting end "1" of the plurality of selectors 202 after being negated by the negator 201 respectively. The selector 202 correspondingly selects and outputs a signal input at "0" or "1" based on the sign 0 or 1 input at the selecting end. The output of the selector 202 at each cascade is summed with the output of the upper cascade of the circuit, and the summed result is output after being delayed a clock period by the delayer and is further summed with the output from the selector of the next cascade, and so on. Till the last cascade of the circuit, the result Real 2 of the second circuit branch is obtained.

Please note that, each of the circuits mentioned above comprises a selector 202, a adder 203 and a delayer circuit 204; moreover, because no signal from the previous cascade is summed with the present cascade selector 202 in the first cascade circuit of the first and second circuit branches, a adder 203 can be omitted in the first cascade circuit as shown in FIG. 4.

The results Real 1 and Real 2 of the two circuit branches are summed in a adder 112 to derive the Real of the despread result.

The structure of a circuit branch for calculating an imaginary of an apparatus according to the present invention as shown in FIG. 4 is described below.

The signs s[1], s[3], . . . , s[15] in odd position of p*(i) are input to the selecting end of a plurality of alternative selector 202 in parallel, the components $I_1, I_3, \ldots, I_{2n-1}$ of I component in odd number are sequentially input to "0" input of the plurality of selectors 202 and are sequentially input to "1" input of the plurality of selectors 202 after being negated by negator 201 respectively. The selector 202 correspondingly selects and outputs a signal input at "0" input or "1" input based on the sign 0 or 1 input at the selecting end. The output of each selector 202 is summed with the output of the upper cascade of the circuit, and the summed result is output after being delayed a clock period by the delayer and is further summed with the output from the selector of the next cascade, and so on. Till the last cascade of the circuit, the result Imag1 of the third circuit branch is obtained.

Similarly, the signs [2], [4], . . . , s[16] in even position of p*(i) are input to the selecting end of the plurality of alternative selector 202 in parallel, components $I_2, I_4, \ldots, I_{2n}$ of I components in even number are sequentially input to "0" input of the plurality of selectors 202 and are sequentially input to "1" input of the plurality of selectors 202 after being negated by the negator 201 respectively. The selector 202 correspondingly selects and outputs a signal input at "0" input or "1" input based on the sign 0 or 1 input at the selecting end. The output of each selector 202 is summed with the output of the upper cascade of the circuit, and the summed result is output after being delayed a clock period by the delayer and is further summed with the output from the selector of the next cascade, and so on. Till the last cascade of the circuit, the result Imag2 of the fourth circuit branch is obtained.

In FIG. 4, 'Real1', 'Real2', 'Imag1' and 'Imag2' meanRe[x(n)]1, Re[x(n)]2, Im[x(n)]1 and Im[x(n)]2 in formula (10), respectively.

Please note that, each of the circuits mentioned above comprises a selector 202, a adder 203 and delayer circuit 204; moreover, because no signal from the previous cascade is summed with the output of the present cascade selector 202 at the first cascade of the circuit of the third and fourth circuit branches, a adder 203 can be omitted in the first cascade of the circuit as shown in FIG. 4.

The results Image 1 and Image 2 from the two circuit branches are summed in the adder 112 to derive the imaginary Imag of the despread result. A combination of the Real and the Imag of the despread result is the final despread result.

Embodiment II

Figure 5:
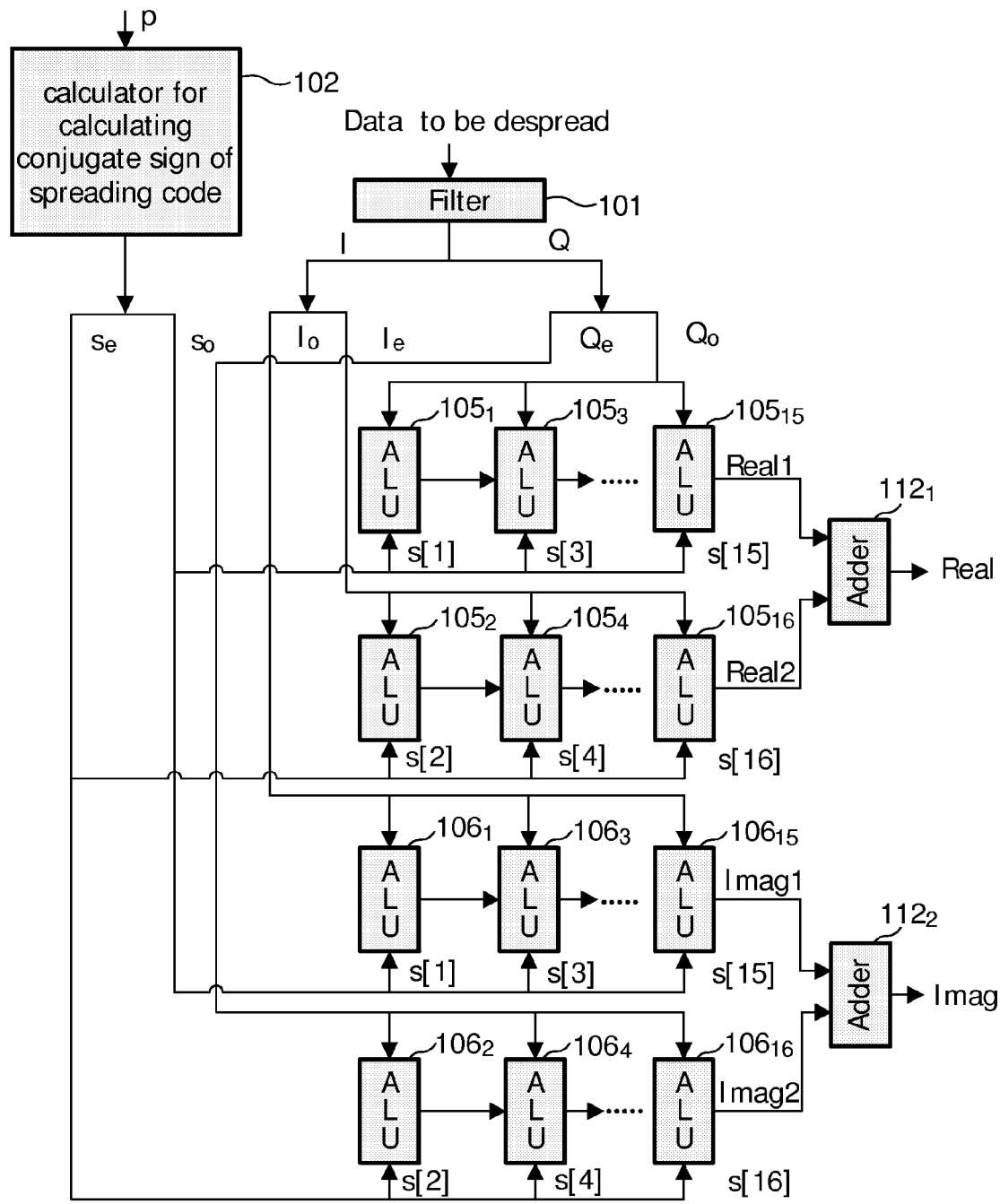
FIG. 5 is a structure diagram of a despreading apparatus according to the second embodiment of the present invention for illustrating the principle of the present invention from another aspect.

FIG. 5 is a structure diagram of a despreading apparatus according to the second embodiment of the present invention, for describing the principle of the present invention from another aspect.

As shown in FIG. 5, data to be despread are filtered by filter 101 and divided into I and Q components. According to sequence, the I and Q components are alternatively divided into components in odd and even numbers, namely $I_o$ and $I_e$, $Q_o$ and $Q_e$ respectively. At the same time, spreading code p is input to a calculator 102 for conjugate sign of the spreading code to calculate the conjugate signs of the spreading code and divide the signs into $s_e$ and $s_o$ in odd and even positions, respectively.

$Q_o$ is input to a plurality of ALUs $105_1, 105_3, \ldots, 105_{15}$ simultaneously. These ALUs simultaneously receive odd positions s[1], s[3], . . . , s[15] from the conjugate signs of the spreading code and are cascaded with one another. That is, the output of the ALU of the previous cascade is connected to the inputting end of the ALU of the subsequent cascade. Since there is no input from other ALU before ALU $105_1$ of the first cascade, input to the inputting end corresponding thereto is 0. Similarly, $Q_e$ is simultaneously input to a plurality of ALUs $106_2, 106_4, \ldots, 106_{16}$. These ALUs simultaneously receive even positions s[2], s[4], . . . , s[16] from the conjugate signs of the spreading code and are cascaded; $I_e$ is simultaneously input to multiple ALUs $105_2, 105_4, \ldots, 105_{16}$, which simultaneously receive even positions s[2], s[4], . . . , s[16] from the conjugate signs of the spreading code and are cascaded; $I_o$ is simultaneously input to a plurality of ALUs $106_1, 106_3, \ldots, 106_{15}$, which simultaneously receive odd positions s[1], s[3], . . . , s[15] from the conjugate signs of the spreading code and are cascaded.

Suppose an input value of $Q_o, Q_e, I_o$ or $I_e$ input is A, an input value of the input connected to the previous cascade is B, and an input value of the sign s input is C and an output value thereof is D, the following operation is performed at each ALU:

$$D = \begin{cases} -A + B & C = 1 \\ A + B & C = 0 \end{cases} \text{ or} \quad (8)$$

$$D = \begin{cases} A + B & C = 1 \\ -A + B & C = 0 \end{cases} \quad (9)$$

where C=0 denotes a positive; C=1 denotes a negative.

The calculation result D of the present cascade will be delayed a clock period and then output to the next cascade ALU.

To use which one of the formulas depends on the position of the ALU. For example, according to FIG. 4, ALUs $105_1, 105_3, \ldots, 105_{15}$ should apply formula (9), while ALUs $105_2, 105_4, \ldots, 105_{16}$, ALUs $106_1, 106_3, \ldots, 106_{15}$, ALUs $106_2, 106_4, \ldots, 106_{16}$ apply formula (8).

The results output from the final cascade ALUs $105_{15}$ and $105_{16}$ are Real 1 and Real 2, respectively. The two results are summed at adder $112_1$ and output to obtain the Real of the despread data.

The results output from the final cascade ALUs $106_{15}$ and $106_{16}$ are Image 1 and Image 2, respectively. The two results are summed at the adder $112_2$ and output to obtain the Image of the despread data.

A combination of the Real and the Imag is the final despread result.

Figure 6:
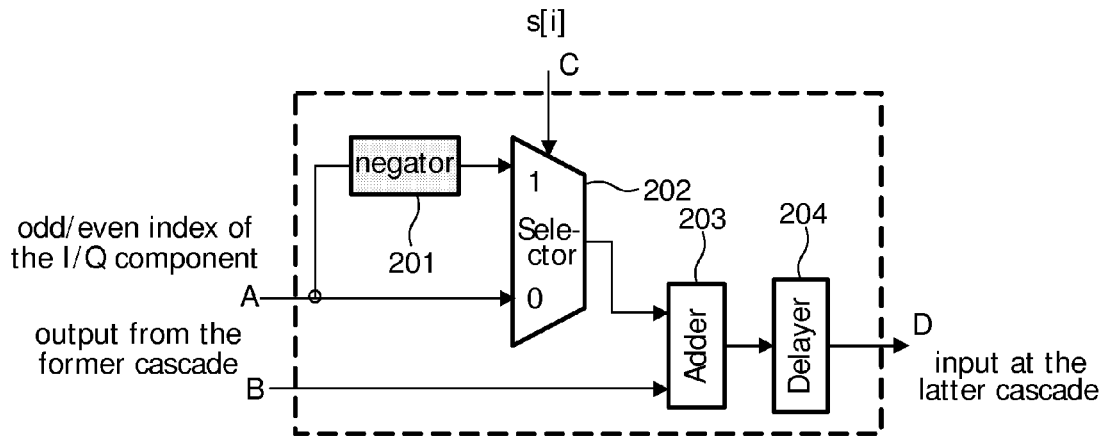
FIG. 6 shows an example of the inner structure of an ALU (Arithmetic Logical Unit) shown in FIG. 5.

FIG. 6 shows an example of the inner structure of the ALU according to FIG. 5. The inner structures of each of the ALUs can be identical or similar so as to facilitate the production. As shown in FIG. 6, the ALU comprises negator 201, alternative selector 202, adder 203 and delayer 204. The selector 202 comprises selecting input C for inputting a value of sign s, "1" input connected with the output of the negator, and "0" input connected with the input of the negator. The selector correspondingly selects the value input at "0" input or "1" input based on whether the value of the selecting input C is 0 or 1. The real/imaginary of I/Q component is input from inputting end A which is connected to "0" input of the selector 202. The outputting end of the selector 202 is connected to an inputting end of the adder 203. The output from the ALU of the upper cascade is input to another inputting end of the adder 203 via inputting end B, and the outputting end of the adder 203 is connected to the delayer 204 and is output from the output D after being delayed a clock period by the delayer. The delayer 204 can also be implemented by a flip-flop.

Figure 7:
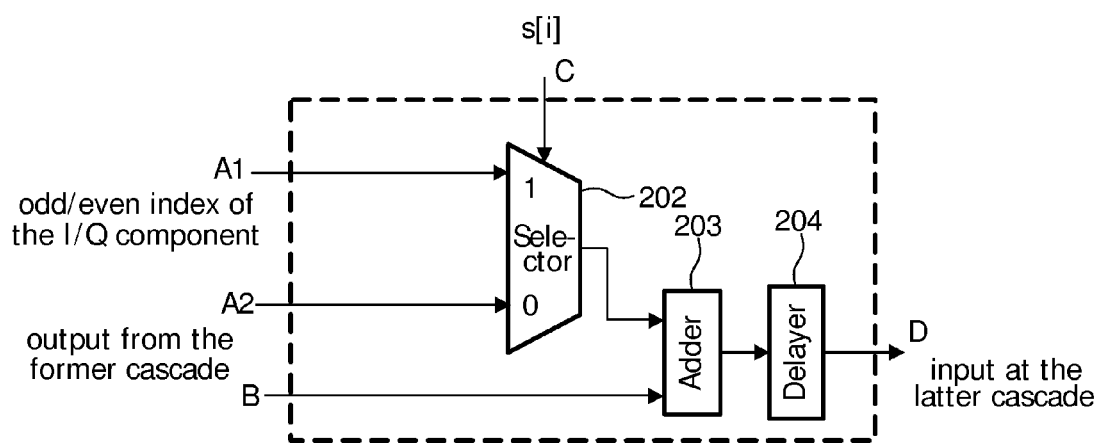
FIG. 7 shows a variation of the inner structure of the ALU shown in FIG. 6.

FIG. 7 is a variation of the inner structure of the ALU as shown in FIG. 6, which will be explained in conjunction with FIGS. 6 and 7. The circuit structure of the ALU as shown in FIG. 6 is used for the calculation of formula (8). If the calculation of formula (9) is to be performed, negator 201 should be put at "0" input of the selector, or else, a negator should be added between input C and the selecting input of selector 202. It should be further noted that the structure of the ALU according to FIG. 6 may be varied. If negator 201 is placed outside the ALU, then a similar structure as that shown in FIG. 4 is obtained. As shown in FIG. 7, the ALU consists of four inputs A1, A2, B and C and an output D, and performs calculation according to the following formula:

$$D = \begin{cases} A1 + B & C = 1 \\ A2 + B & C = 0 \end{cases} \text{ or} \quad (10)$$

$$D = \begin{cases} A2 + B & C = 1 \\ A1 + B & C = 0 \end{cases} \quad (11)$$

The calculation result is output after being delayed for a clock period.

A1 and A2 receive the negated I/Q component simultaneously.

A cascade number of the ALUs depends on the spreading factor SF. Since the above example is given based on SF=16, the cascade number of the ALUs is 8. To further illustrate the principle of the present invention, a concrete example is given below to exhibit the calculation procedure of an ALU cascaded branch. Suppose there are 4 ALUs cascaded in total, and d denotes a value of Q or I, and "*" denotes the selecting calculation of the selector.

Suppose data input from moment 1 to moment 4 are d1, d3, d5 and d7 respectively, i.e., a datum is input at each moment, the output result from the adder of the ALU of each cascade is given in the following Table.

TABLE 1

| moment | Output from the adder of the first cascade | Output from the adder of the second cascade | Output from the adder of the third cascade | Output from the adder of the fourth cascade |
|---|---|---|---|---|
| 1 | d1 * s1 | d1 * s3 | d1 * s5 | d1 * s7 |
| 2 | d3 * s1 | d1 * s1 + d3 * s3 | d1 * s3 + d3 * s5 | d1 * s5 + d3 * s7 |
| 3 | d5 * s1 | d3 * s1 + d5 * s3 | d1 * s1 + d3 * s3 + d5 * s5 | d1 * s3 + d3 * s5 + d5 * s7 |
| 4 | d7 * s1 | d5 * s1 + d7 * s3 | d3 * s1 + d5 * s3 + d7 * s5 | d1 * s1 + d3 * s3 + d5 * s5 + d7 * s7 |

At the first moment, the output of an upper cascade is 0, hence the output from the adder of each cascade is the same as that of the selector of each cascade (as shown in the first line).

At the second, third and fourth moments, the output from the adder of each cascade is output from the ALU of each cascade to the ALU of next cascade after being delayed by the delayer for a clock period and is summed with the result output at the identical moment from the selector of the next cascade; the result of the fourth adder is the desired result.

When conjugate signs of the spreading code are s1, s3, s5 and s7, data d1, d3, d5 and d7 have sequentially been input at the fourth moment. The result at the fourth adder is the result desired by dispreading, namely d1*s1+d3*s3+d5*s5+d7*s7, which is consistent with the formula on the first line of formula (7). Table 1 shows how the subsequent moment uses the calculation result of the previous moment.

In the first and second embodiments, four different values of each of the units are distinguished by dividing each of the units of the spreading sequence into odd and even parts and judging whether the conjugate signs of each of the units of the spreading sequence are positive or negative. Alternatively, the values of each of the units of spreading sequence can be estimated by the preset means 10 as shown in FIG. 1, and then different values are expressed by preset selecting signals capable of representing state numerals corresponding to possible values. For example, in the case of only four possible values, the values' states can be expressed by a two-bit binary value. Hereinafter, the corresponding relationship between each of the component means as shown in FIG. 1 and each of the components in the first and second embodiments.

The filter 101 as shown in FIGS. 4 and 5 and its correlative circuit correspond to the preprocess means 20 as shown in FIG. 1. The means (not shown) for dividing data to be despread into I and Q components in FIGS. 4 and 5 corresponds to the extraction means 30 as shown in FIG. 1. The ALU as shown in FIG. 5 and the combining circuit containing the selector as shown in FIG. 6 or 7 correspond to the selecting processing means 40 as shown in FIG. 1. Sign sequence [i] as shown in FIGS. 4 and 5 corresponds to the preset selecting signal produced by the preset means 10 according to the spreading sequence as shown in FIG. 1. And the adder 112 as shown in FIGS. 4 and 5 corresponds to the summing means 50 as shown in FIG. 1.

In addition to the above embodiments, there are various variations of the present invention. For example, if the signal situation is good enough to ensure the required signal-to-noise ratio, the filter 101 as shown in FIG. 4 can be omitted.

FIG. 4 describes where the spreading factor SF=16; however, the spreading factor SF can also be in other values, which is usually 2 to the integer power. FIG. 4 shows 4 blocks of memory $103_o$, $103_e$, $104_o$ and $104_e$ for storing odd and even components of I and Q; however, the memories can also be omitted, as long as the odd and even components of I and Q components are in sequence transmitted in different paths. The first and second embodiments are based on TD-SCDMA standard, whereas the present invention is not limited thereto. The present invention can be applied provided the value of spreading code is within a known limited set. For example, it is known that in the WCDMA standard, the value of spreading code is in the range of $\{1+j, 1-j, -1+j, -1-j\}$, it can be obtained by substituting the values into the formulas (3) and (4) to obtain:

$$y(i) = z[(n-1) \times SF + i] \times p^*(i) = \tag{12}$$

$$w(i) \times p^*(i) = \begin{cases} (I-Q) + j(I+Q) & p^*(i) = 1+j \\ (I+Q) + j(-I+Q) & p^*(i) = 1-j \\ (-I-Q) + j(I-Q) & p^*(i) = -1+j \\ (-I+Q) + j(-I-Q) & p^*(i) = -1-j \end{cases}.$$

It is evident that a corresponding element can be definitely selected from the set $\{(I-Q)+j(I+Q), (I+Q)+j(-I+Q), (-I-Q)+j(I-Q), (-I+Q)+j(-I-Q)\}$ to serve as a despread result based on the value of the spreading code when the present invention is applied in the WCDMA standard.

Many other modifications and variations can be made without departing from the concept and scope of the present invention. It is understood that the present invention is not limited to the specific embodiments, and the scope thereof should be defined by the appended claims.

The invention claimed is:

1. A method for despreading a spread signal used in a receiver of a wireless communication system, comprising:
preprocessing the spread signal to derive a group of spreading chips corresponding to a data symbol;
processing the spreading chips to extract cophase components and orthogonal components of each spreading chip; and
combining the group of cophase components and orthogonal components to derive a group of despreading chips based on a preset selecting signal, wherein a real component of despread data is obtained, without a multiplier, using only the orthogonal component with one of odd bits and even bits of a spreading sequence and only the cophase component with the other of the odd bits and even bits of the spreading sequence.

2. The method according to claim 1, wherein an imaginary component of despread data is obtained using only the orthogonal component with one of even bits and odd bits of the spreading sequence and only the cophase component with the other of the even bits and odd bits of the spreading sequence.

3. The method according to claim 1, wherein the preset selecting signal is the signal based on the known spreading sequence.

4. The method according to claim 1, wherein the combining process comprises negating the cophase component and orthogonal component to derive negated cophase component and negated orthogonal component.

5. The method according to claim 4, wherein the combining process further comprises performing a preset combining calculation on the cophase component, the negated cophase component, the orthogonal component and the negated orthogonal component.

6. The method according to claim 1, wherein each of the dispreading chips is selected from a group of expected results.

7. The method according to claim 3, wherein the wireless communication system is a TD-SCDMA system, and the value of each unit of the known spreading sequence is selected from the set $\{1, -1, j, -j\}$.

8. A method for despreading a spread signal used in a receiver of a wireless communication system, comprising:
preprocessing the spread signal to derive a group of spreading chips corresponding to a data symbol;
processing the spreading chips to extract cophase components and orthogonal components of each of the spreading chips;
converting and combining the group of cophase components and orthogonal components to derive a group of despreading chips based on a preset selecting signal;
wherein each of the despreading chips is selected from a group of expected results;
wherein the wireless communication system is a TD-SCDMA system; and the expected result is selected from the set $\{I+jQ, -I-Q, -Q+jI, Q-jI\}$, in which I is the cophase component, Q is the orthogonal component, $-I$ is the negated cophase component, and $-Q$ is the negated orthogonal component.

9. The method according to claim 8, wherein the wireless communication system is a WCDMA system, and the value of each unit of the known spreading sequence select is selected from the set $(1+j, 1-j, 1+j, -1-j)$.

10. A method for despreading a spread signal used in a receiver of a wireless communication system, comprising:
preprocessing the spread signal to derive a group of spreading chips corresponding to a data symbol;
processing the spreading chips to extract cophase components and orthogonal components of each of the spreading chips;
converting and combining the group of cophase components and orthogonal components to derive a group of despreading chips based on a preset selecting signal;
wherein each of the despreading chips is selected from a group of expected results;
wherein the wireless communication system is a WCDMA system; and
the expected result is selected from the set $(I-Q)+j(I+Q)$, $(I+Q)+j(-I+Q)$, $(-I-Q)+j(I-Q)$, $(-I+Q)+j(-I-Q)\}$, in which I is the cophase component, Q is the orthogonal component, $-I$ is the negated cophase component, and $-Q$ is the negated orthogonal component.

11. An apparatus configured to despread a spread signal used in a receiver of a wireless communication system, comprising:
a preprocessor configured to preprocess the spread signal to derive a group of spreading chips corresponding to a data symbol;
an extractor configured to process the spreading chip to extract cophase components and orthogonal components of each spreading chip; and
a selector and processor configured to combine the group of cophase components and orthogonal components based on a preset selecting signal to derive a group of despreading chips, wherein a real component of despread data is configured to be obtained using only the orthogonal component with odd bits of a spreading sequence and only the cophase component with even bits of the spreading sequence.

12. The apparatus according to claim 11, wherein an imaginary component of despread data is configured to be obtained using only the orthogonal component with even bits of the spreading sequence and only the cophase component with odd bits of the spreading sequence.

13. The apparatus according to claim 11, wherein the real component is configured to be obtained without a multiplier.

14. The apparatus according to claim 11, further comprises a preset means configured to set the preselecting signal based on a signal of a known spreading sequence.

15. The apparatus according to claim 11, wherein the selecting and processing means comprises a negating means configured to negate the cophase component and the orthogonal component to derive the negated cophase component and the negated orthogonal component.

16. The apparatus according to claim 15, wherein the selecting and processing means further comprises a combining means configured to perform preset combining calculation on the cophase components, the negated cophase components, the orthogonal components and the negated orthogonal components.

17. The apparatus according to claim 11, wherein each of the dispreading chips is selected from a group of the expected results.

18. The apparatus according to claim 14, wherein the wireless communication system is a TD-SCDMA system, and the value of each unit of the known spreading sequence is selected from the set $\{1, -1, j, -j\}$.

19. An apparatus configured to despread spread signal used in a receiver of a wireless communication system, comprising:
- a preprocess means configured to preprocess spread signal to derive a group of spreading chips corresponding to a data symbol;
- an extraction means configured to process the spreading chip to extract cophase components and orthogonal components of each of the spreading chips;
- a selecting and processing means configured to convert and combine the group of cophase components and orthogonal components based on a preset selecting signal to derive a group of despreading chips;
- wherein each of the despreading chips is selected from a group of the expected results;
- wherein the wireless communication system is a TD-SCDMA system; and
- the expected result is selected from the set $\{I+jQ, -I-Q, -Q+jI, Q-jI\}$, in which I is the cophase component, Q is the orthogonal component, -I is the negated cophase component, and -Q is the negated orthogonal component.

20. The apparatus according to claim 14, wherein the wireless communication system is a WCDMA system; and the value of each unit of the known spreading sequence is selected from the set $\{1+j, 1-j, 1+j, -1-j\}$.

21. An apparatus configured to despread spread signal used in a receiver of a wireless communication system, comprising:
- a preprocess means configured to preprocess spread signal to derive a group of spreading chips corresponding to a data symbol;
- an extraction means configured to process the spreading chip to extract cophase components and orthogonal components of each of the spreading chips;
- a selecting and processing means configured to convert and combine the group of cophase components and orthogonal components based on a preset selecting signal to derive a group of despreading chips;
- wherein each of the despreading chips is selected from a group of the expected results;
- wherein the wireless communication system is a WCDMA system; and
- the expected result is selected from the set $\{(I-Q)+j(I+Q), (I+Q)+j(-I+Q), (-I-Q)+j(I-Q), (-I+Q)+j(-I-Q)\}$, in which I is the cophase component, Q is the orthogonal component, -I is the negated cophase component, and -Q is the negated orthogonal component.

* * * * *

UNITED STATES PATENT AND TRADEMARK OFFICE
CERTIFICATE OF CORRECTION

PATENT NO. : 8,958,459 B2  Page 1 of 1
APPLICATION NO. : 11/815207
DATED : February 17, 2015
INVENTOR(S) : Xia Zhu and Yan Li It is certified that error appears in the above-identified patent and that said Letters Patent is hereby corrected as shown below:

In the Claims:
Claim 9, Column 14, line 31: change "(1+j, 1–j, 1+j, –1–j}" to "{1+j, 1–j, 1+j, –1–j}"
Claim 10, Column 14, starting line 46: change "(I–Q)+j(I+Q), (I+Q)+j(–I+Q), (–I–Q)+j(I–Q), (–I+Q)+j(–I–Q)}" to "{(I–Q)+j(I+Q), (I+Q)+j(–I+Q), (–I–Q)+j(I–Q), (–I+Q)+j(–I–Q)}"

Signed and Sealed this
Twenty-sixth Day of May, 2015

Michelle K. Lee
*Director of the United States Patent and Trademark Office*